United States Patent
Faden

(10) Patent No.: US 7,185,210 B1
(45) Date of Patent: Feb. 27, 2007

(54) POLICY ABSTRACTION MECHANISM

(75) Inventor: Glenn Faden, Novato, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1688 days.

(21) Appl. No.: 08/668,892

(22) Filed: Jun. 24, 1996

(51) Int. Cl.
*G06F 9/44* (2006.01)

(52) U.S. Cl. ............... 713/200; 713/201; 713/202; 718/100

(58) Field of Classification Search ............. 395/670, 395/187.01, 186, 676; 707/9; 713/200, 713/201, 1, 202; 711/163, 164
See application file for complete search history.

(56) References Cited

U.S. PATENT DOCUMENTS

| | | | | |
|---|---|---|---|---|
| 4,833,594 | A | * | 5/1989 | Familetti et al. ............... 713/1 |
| 5,265,221 | A | * | 11/1993 | Miller ........................ 711/163 |
| 5,305,456 | A | * | 4/1994 | Boitana ...................... 395/186 |
| 5,375,241 | A | * | 12/1994 | Walsh ........................ 719/331 |
| 5,606,668 | A | * | 2/1997 | Shwed ................. 395/200.11 |
| 5,720,033 | A | * | 2/1998 | Deo ............................ 713/200 |
| 6,430,685 | B1 | * | 8/2002 | Yu et al. ....................... 713/1 |

OTHER PUBLICATIONS

"Flexible Method for Error Recovery", IBM Technical Disclosure Bulletin, Oct. 1993, US, vol. No. 36, Issue Numbe 10, p. No. 467-468.*

"Good Multiple Dispatching Techniques", James Kanze, Oct. 10, 1993, (Kanze@us-es.sel.de).*

"RACF Start System for MVS", Document No. GC24-3120-01, Sep. 1992, International Technical Support Center, pp. 128-131.*

"Access control systems: From host-centric to network-centric computing", Benantar et al, IBM Systems Journal, vol. 35, No. 1, 1996, pp. 94-112.*

"A Retrospective on the VAX VMM Security Kernel", Karger et al, IEEE Transactions on Software Engineering, vol. 17, No. 11, Nov. 1991, pp. 1147-1164.*

* cited by examiner

*Primary Examiner*—Majid Banankhah
(74) *Attorney, Agent, or Firm*—Robert C. Kowert; Meyertons, Hood, Kivlin, Kowert & Goetzel, P.c.

(57) ABSTRACT

A secure operating system is disclosed in which all code implementing security functionality resides in a security module separate from the operating system code. Calls involving security functions are made using a format or interface which is standardized for all systems. Such a call identifies, inter alia the response and the access mode which are used to identify a call in a two dimensional table which contains a pointer to the needed security functions. In the way security functions are separately compilable and security solving changes can be made by linking in a new security module. Maintenance of security code is separated from maintenance of the underlying operating system.

17 Claims, 7 Drawing Sheets ts2_policy (ACCESS_METHOD, TYPE_OF_OBJECT, DATA_POINTER,
 ATTRIBUTES_OF_REQUESTOR, PORTIONS_OF_POLICY_ENFORCED,
 MISCELLANEOUS)

Figure 3

POLICY ABSTRACTION MECHANISM

BACKGROUND OF THE INVENTION

1. Field of the Invention

The invention relates to the field of computer systems and more particularly to improved trusted operating systems.

2. Description of Related Art

In the early days of computers, commands were given to a processing element using the only language the processing element understood, namely machine language. Programmers soon appreciated the fact that certain types of procedures were repeated over and over again when using a digital computer. Some of these procedures included getting information from a keyboard, reading and writing information to memory, displaying information and the like. Since humans don't translate 1's and 0's very well and processing elements do not understand natural language, translators were developed for translating shorthand representations for some of these standardized routines into machine language. Assembly language statements were mnemonically related to the function invoked when the assembly language statement was translated into machine language. As programming languages developed, the commands set for invoking these repetitive functions became more and more like the natural language of the user. Operating systems such as DOS and UNIX were developed which permitted a user or an application process to invoke the repetitive functions utilizing commands that were somewhat recognizable to a human.

As multiple users begin to utilize computer systems in cooperative endeavors, a need for security became apparent to ensure that an unauthorized person did not affect adversely the data or programming work of others or the integrity of production programs.

Operating systems designed for small systems, such as DOS and Windows 95 (trademarks of Microsoft Corporation), have essentially no security features, apparently relying instead on the ability of a user to secure the computer on which the software runs. In order to provide security in an operating system, all access mechanisms need to be modified to prevent unauthorized access to information and programs. In the past, this was done by inserting special codes at various points throughout the software system.

The UNIX operating system provided only security based on ownership of the information. That is, the creator of the information "owned it" and therefore only he or she could authorize others to use that information.

The Problems

The distribution of security code throughout an operating system creates serious maintenance problems. With each revision of security policy, it becomes necessary to revise the source code and recompile it. This can be a slow and time consuming process. Further, different governments, different agencies and different customers have different needs. Therefore, to accommodate these needs, an operating system would require multiple versions and releases be maintained, one for each customer with different needs. The rapidity with which security policies change to face varying perceptions of threat means a constant and ongoing maintenance effort of substantial proportions to keep each version of the software current. Portability problems arise too, because sometimes special fixes incorporated into a version of software won't necessarily work on different platforms.

Further, separate operating system code versions would be required for a trusted operating system and a non-trusted version of the same operating system even though the functionality not related to security features should be substantially identical.

The code version maintained for different customers might be quite different in different countries. Where the security features of an operating system are to be evaluated by an agency, the evaluators want to know (1) where is your policy, (2) how does it work and (3) how do we know it was done right. Having to hunt through 10 million lines of code to identify the security features is something for which agency evaluators would have little tolerance.

SUMMARY OF THE INVENTION

The present invention provides apparatus, systems, processes and computer program products which have the advantage of overcoming the problems of the prior art.

The invention implements a security policy mechanism which uses a standardized interface for invoking security enforcing functions. A standardized call invokes a table driven set of security routines which enforce all relevant security policies. The security policy mechanism is implemented using:

1. a generic policy hook;
2. a set of policy implementing routines;
3. a set of tables linking a code for security services using the generic policy hook with the policy implementing routines; and
4. a set of handle files one for each subsystem defining specific resources and access types for which corresponding table entries are defined.

The invention is directed to secure computer apparatus including a computer, and a secure operating system on the computer controlling access to one or more systems, comprising a common interface used for calls to all security functions, and a table accessed by variables identifying a resource and an access mode specified in a call using the interface, each entry in the table pointing to a security policy function appropriate to the variables specified in the call. Other variables passed to the common interface include one or more of variables pointing to data, identifying attributes of a requester, identifying portions of security policy to be enforced and specifying miscellaneous functions.

The invention is also directed to a method of organizing a secure operating system, by providing a common interface used for all requests for security functions, providing a separate file of security functions, and providing a table accessed by information provided in a request for security functions which points to an appropriate security function in the separate file.

The invention is also directed to a method of invoking security functions in a secure operating system, by requesting security functions in a program call using an interface common to all systems using security services, accessing a table based on information provided in the call, and invoking a security function pointed to by the table.

The invention is also directed to a method of creating a secure operating system by inserting compiler directives at points in operating system code at which security services are needed, the directives accessing a security policy table using resource and access method information, storing at each entry in the security policy table a pointer to a security function appropriate to the resource and access method, and storing the table and security functions in a separate file from the operating system code. The operating system code and the table and security functions are separately compiled and linked together into an executable version of the secure operating system.

The invention is also directed to a method of changing security policy for a secure operating system, changing a security policy table or one or more security functions and recompiling them, and linking a recompiled security policy table or one or more security functions with an unchanged object code version of the operating system.

The invention is also directed to a method of creating a secure operating system, by separating all security functions into a file separate from operating system code. All security functions are accessed using requests in a common format.

The invention is also directed to a secure computer system, including a network, and a plurality of computers connected to the network, at least one of the computers having a secure operating system controlling access to the network and to other sub-systems, the operating system having a common interface used for calls to all security functions, and a table accessed by variables specified in a call using the interface, each entry in the table pointing to a security policy function appropriate to the variables specified in the call.

The invention is also directed to a computer product, including a memory medium, and a computer program stored on the memory medium. The computer program contains instructions implementing one or more operating system functions and implementing a common interface used for all requests for security functions. A separate file of security functions and a table are stored on the memory medium. The table is accessed by information provided in a request for security functions and points to an appropriate security function in the separate file.

The invention is also directed to a computer program product, including a memory medium, and a separate file of security functions, stored on the memory medium. A table, stored on the memory medium is accessed by information provided in a request for security functions which points to an appropriate security function in the separate file.

The invention is also directed to a computer program product, including a memory medium, and an operating system stored on the memory medium. The operating system contains instructions implementing a common interface used for all calls for security functions.

The invention is also directed to a computer program product, including a memory medium, and a computer program stored on the memory medium. The computer program contains instructions for requesting security functions in a program call using an interface common to all systems using security services.

The invention is also directed to a computer program product, including a memory medium, and a computer program stored on the memory medium. The program comprises an object code version of operating system code linked together with an object code version of security functions.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which:

FIG. 3 is an illustration of a standardized "hook" or interface used to invoke security functions.

NOTATIONS AND NOMENCLATURE

Figure 1A:
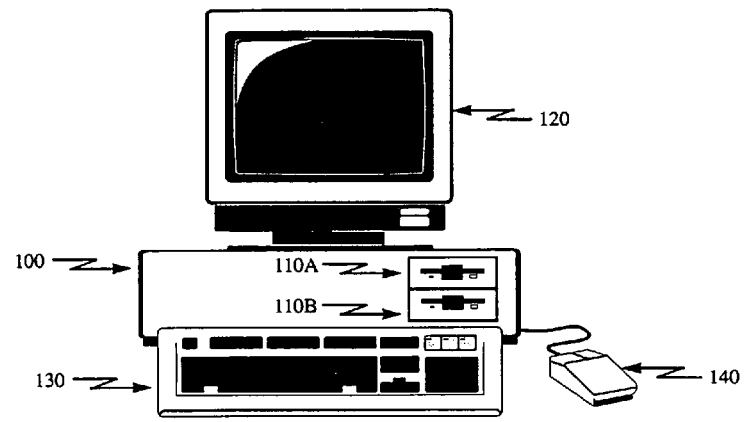
FIG. 1A illustrates a computer of a types suitable for carrying out the invention.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The invention uses a hook architecture to implement the system security policy. It uses a simple calling sequence based on a table driven set of policy abstraction routines. The routines are intended to enforce all relevant security policies, for example, MAC (Mandatory Access Control), DAC (Discretionary Access Control), IL (Information Labelling) and auditing policies.

The procedures described herein apply to the kernel, the window system and other policy enforcing programs. Dynamic linking of the policy abstraction routines is implemented.

The security policy mechanism in accordance with the invention consists of four basic components:

1. A generic policy hook which is inserted between condition compilation directives wherever the results of a security policy decision must be determined.

The term hook is used because it is just a place to hang the call to the policy routines. The actual policy code is external to the file containing the hook.

2. A set of policy implementing routines which are maintained in shared libraries (for applications) or in a loadable module (for the kernel).

Ideally, each policy function comprises the complete policy (MAD, DAC, ILs, privilege override, auditing, etc.) for a particular transaction (a transaction is defined by the combination of a specific access type, and specific protected resource type).

3. A set of tables which provide the connections between the generic policy hooks and the specific policy routines.

The tables contain pointers to the individual policy routines. For each subsystem, there is a separate table. The rows of the table correspond to the set of protected resources (objects) that are provided by the particular subsystem. The columns correspond to the set of access types for which unique security policies exist.

4. A set of header files defining the policy hooks.

Each subsystem, e.g. the kernel, or the X server, will have its own header file. The header file will define the enumerated lists of protected resources and access types for which there are corresponding table entries.

FIG. 1A illustrates a computer of a type suitable for carrying out the invention. Viewed externally in FIG. 1A, a computer system has a central processing unit 100 having disk drives 110A and 110B. Disk drive indications 110a and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC work-station from Sun Microsystems, Inc.

Figure 1B:
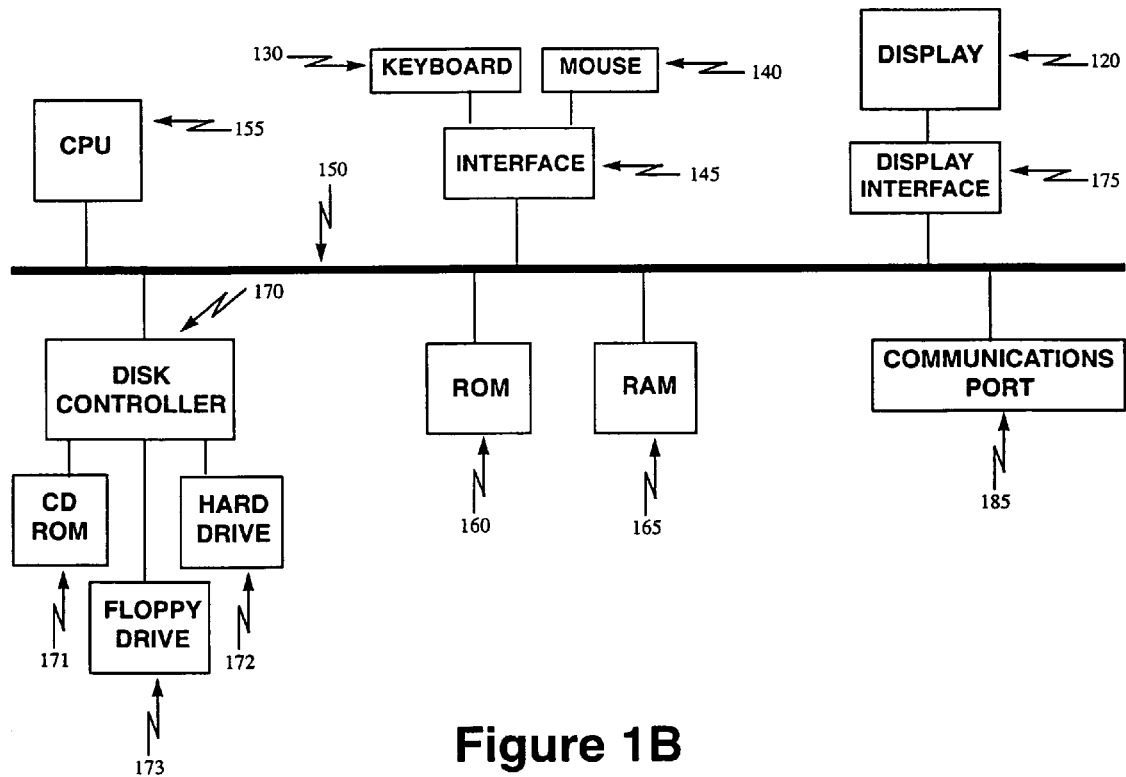
FIG. 1B illustrates a block diagram of the computer of FIG. 1A.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces ones or more disk drives to the system bus 150. These disk drives may floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices can occur over communications port 185.

Figure 1C:
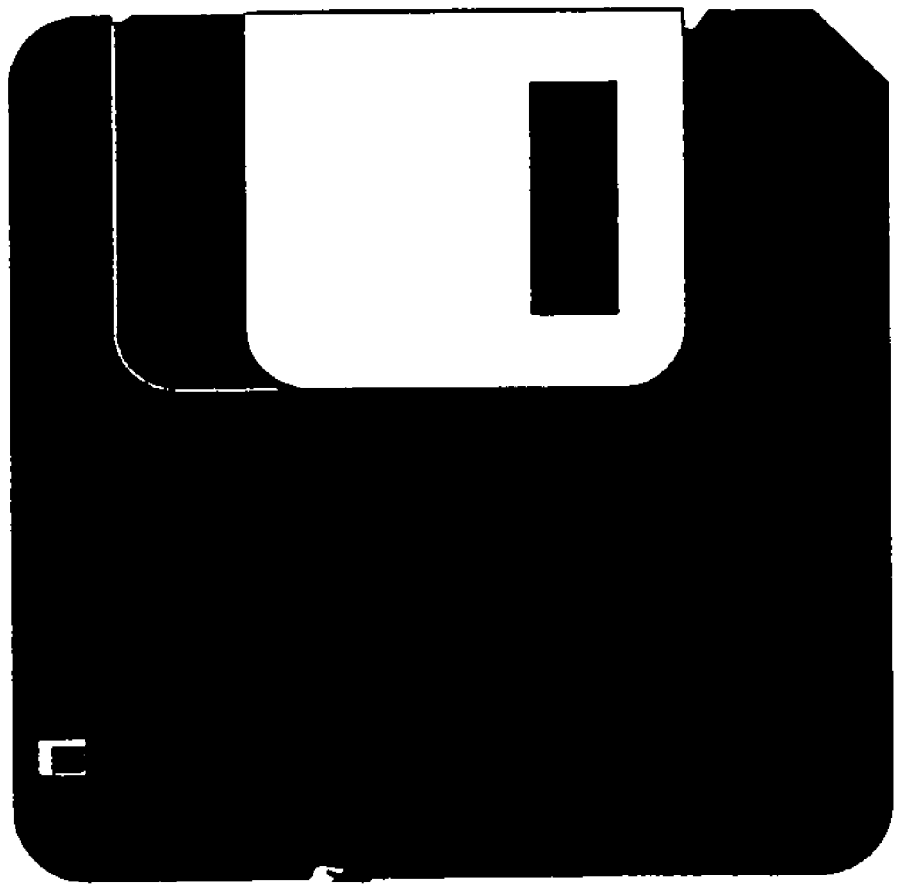
FIG. 1C illustrates an exemplary memory medium containing one or more programs usable with the computer of FIG. 1A.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain, the program information for controlling the computer to enable the computer to perform its functions in accordance with the invention.

Figure 2:
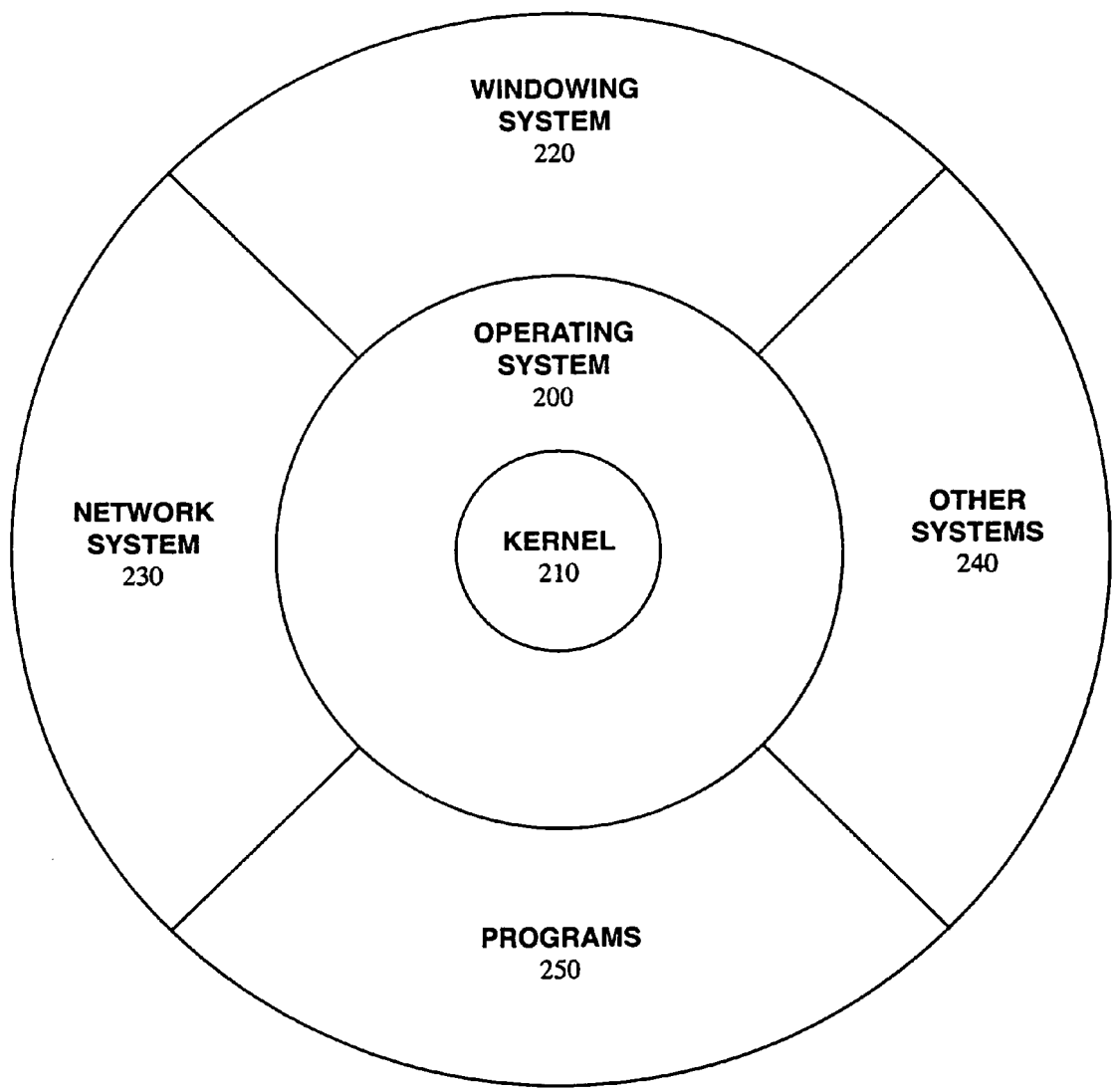
FIG. 2 is an illustration of various systems programming in a trusted environment in accordance with the invention.

FIG. 2 is an illustration of various systems running in a trusted environment in accordance with the invention. FIG. 2 shows an operating system 200 having a kernel 210 the global kernel represents the most important functions of the operating system. Kernal functions normally have priority over other processes within the system in which are optimized for high performance. The operating system controls a windowing system 220 and a network system 230 as well as a variety of other systems 240. Users and programs utilize the operating system to invoke the services of the systems 220, 230, and 240 as well as to invoke services provided by the operating system itself.

FIG. 3 is an illustration of a standardized "hook" or Application Programming Interface (API) used to invoke securities features. The hook is a function which passes a plurality of variables for use in invoking security features, returns a value "0" if execution completes without violation of a security policy and which presents an error number or message if a policy is violated.

The variables sent with the invocation of the function shown in FIG. 3 include access_method, type_of_objects, data_pointer, attributes_of_requestor, of_policy_enforced, and miscellaneous. The variables access_method and type_of_object are utilized as dimensions of a two dimensional input to a look-up table which points to a particular policy function to be implemented under the circumstances of the type of object and access method utilized. The attributes_of_the requester and the portion_of_policy_enforced and the data-pointer are utilized when the policy function selected is executed.

Figure 4:
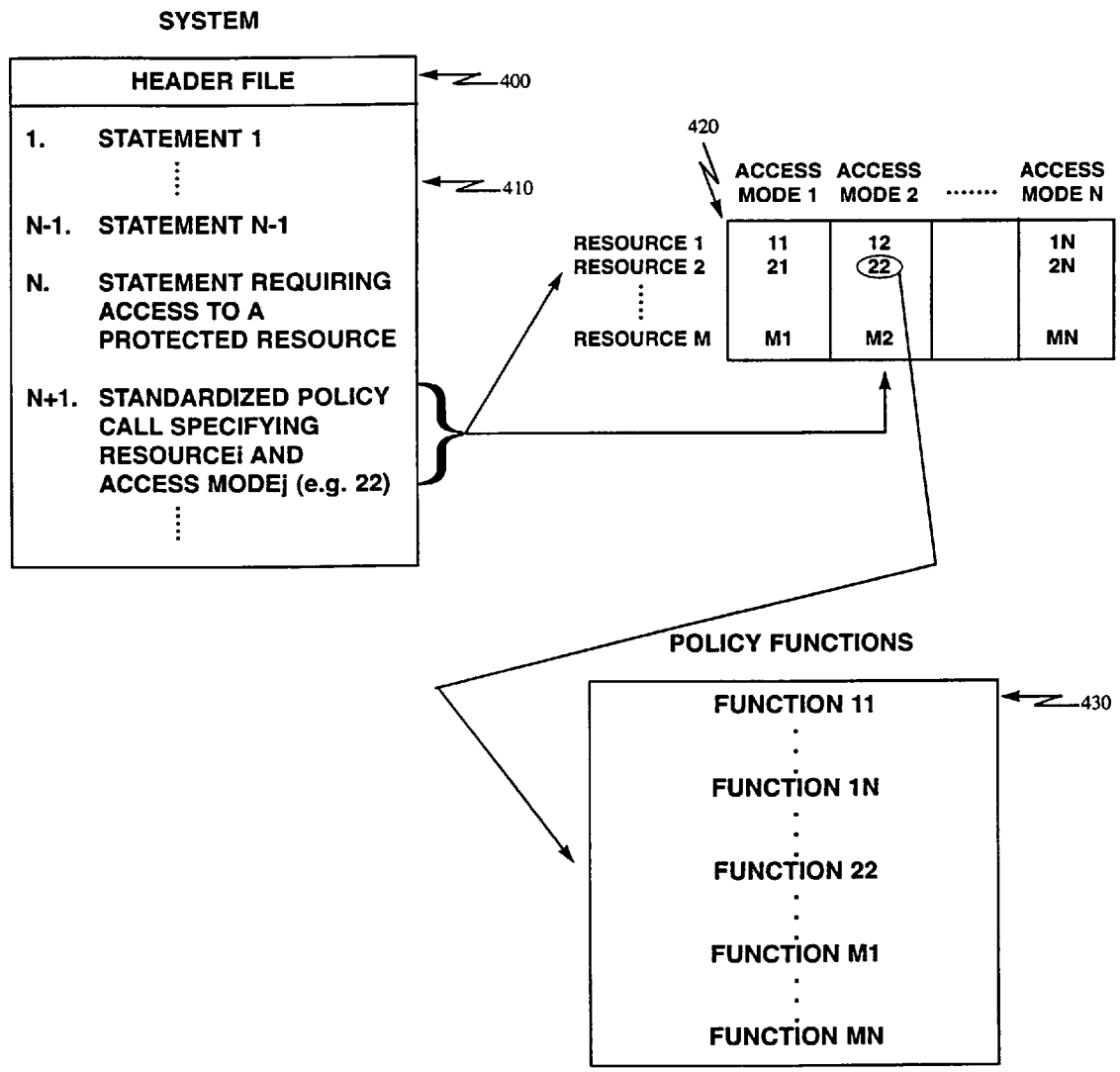
FIG. 4 illustrates the use of the standardized interface of FIG. 3

FIG. 4 illustrates in more detail, the use of the standardized hook of FIG. 3 to access a policy function table and policy functions pointed to by that table. A system utilizing trusted services of the operating system each have a header file 400 and programming statements which are being executed. In the example shown, the statement are numbered 1 through N+1 and beyond. In the example illustrated in FIG. 4, programming statements 1 through N−1 execute without requiring security features. Statement N however requires access to a protected resource. At statement N+1, a standardized policy call utilizing the hook on ARI of FIG. 3 specifies the resource and the access mode needed. In the example shown, resource 2 and access mode 2, are specified. A policy function table 420 maps particular resources against various types of access modes. Since resource 2 is involved, row 2 of the policy function table is used. The access mode is also 2 directing one the second column of the policy function table. The intersection of the row of resource 2 with the column of access mode 2 points to a policy function found in policy function storage 430 namely function 22. Function 22, in the example, is executed in response to the identification of 22 in the policy function table.

One of the advantages of the architecture shown in FIG. 4 is that the policy function table and policy functions shown in items 420 and 430 together constitute a policy module which can be separately compiled and linked with the underlying system 400 so that when changes in the policy functions or the mapping of a policy function to a resource and access mode pair changes, only a change to a single policy module is required. The system or the system user is unaware of the fact that the policy function may have changed or the relationship between policy functions and resources and access modes may have changed. This enables the policy module to be maintained independently of the underlying system. Thus, different customers or different nations or different agencies have different security policies, can have these implemented by merely changing the policy module to reflect the changed requirement. The underlying system needs not be rewritten because the standardized hook or application programming interface to the policy module remains unchanged.

The architecture shown in FIG. 4 also affirmatively permits an evaluator to answer the questions where is your policy, how does it work, and how do we know it was done right. To answer the first question, it is located in the policy module. How does it work is answered by the particular policy function involved. The code is identifiable and visible without looking through ten million lines of code. How do we know it was done right can be answered because the interface ensures the system implementation was correct and then one need only follow the process through the policy function table to the policy function themselves to determine in a quick and visible manner what was done. One can see from FIG. 4 that the software utilized for the system itself is substantially unchanged from software which invokes no security features and yet security features can be implemented immediately and quickly by bringing in an appropriate security module.

Figure 5:
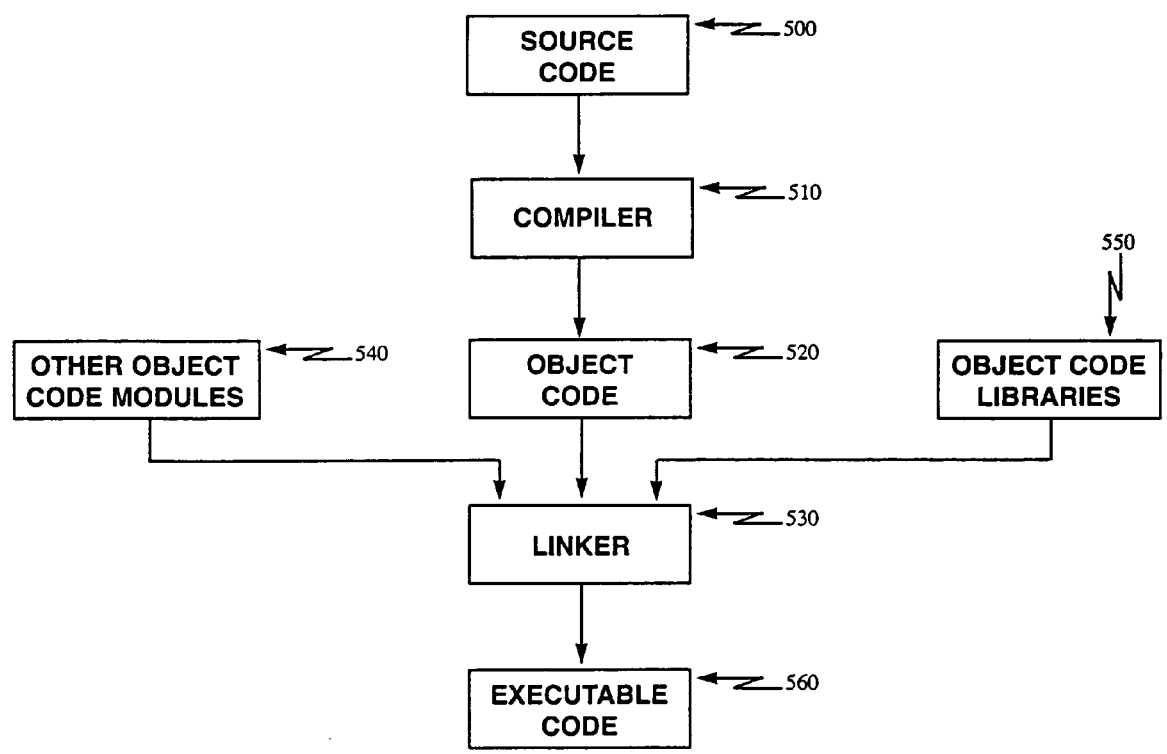
FIG. 5 illustrates a process of compiling source code and linking object code modules into executable code.

FIG. 5 illustrates a process of compiling source code and linking object code modules into executable code. Source code 500 is a high level expression of a computer program. Source code is compiled (510) into object code (500). A module of object code 520 can be linked with other code modules (540) and can incorporate entire libraries of object code (550). Complied versions of modules can be combined together or "linked" (530) into executable code (560). When one module changes, only that module needs to be recompiled and then relinked with the other modules to result in changed and upgraded executable code. The policy module described in conjunction with FIG. 4 is a separately compiled module so that when a new security policy changes, it can be implemented with changes to only a single module. Therefore only one module needs to be recompiled and linked in with the remaining system.

Note that in the prior art, when a security policy changed, it might affect seven or eight different modules of an overall system because the code for implementing the security features was distributed throughout the system. As shown in FIG. 4, that is not the case in accordance with the applicants invention. Rather, all security functionality can be defined upgraded, changed and implemented in a single module.

Figure 6:
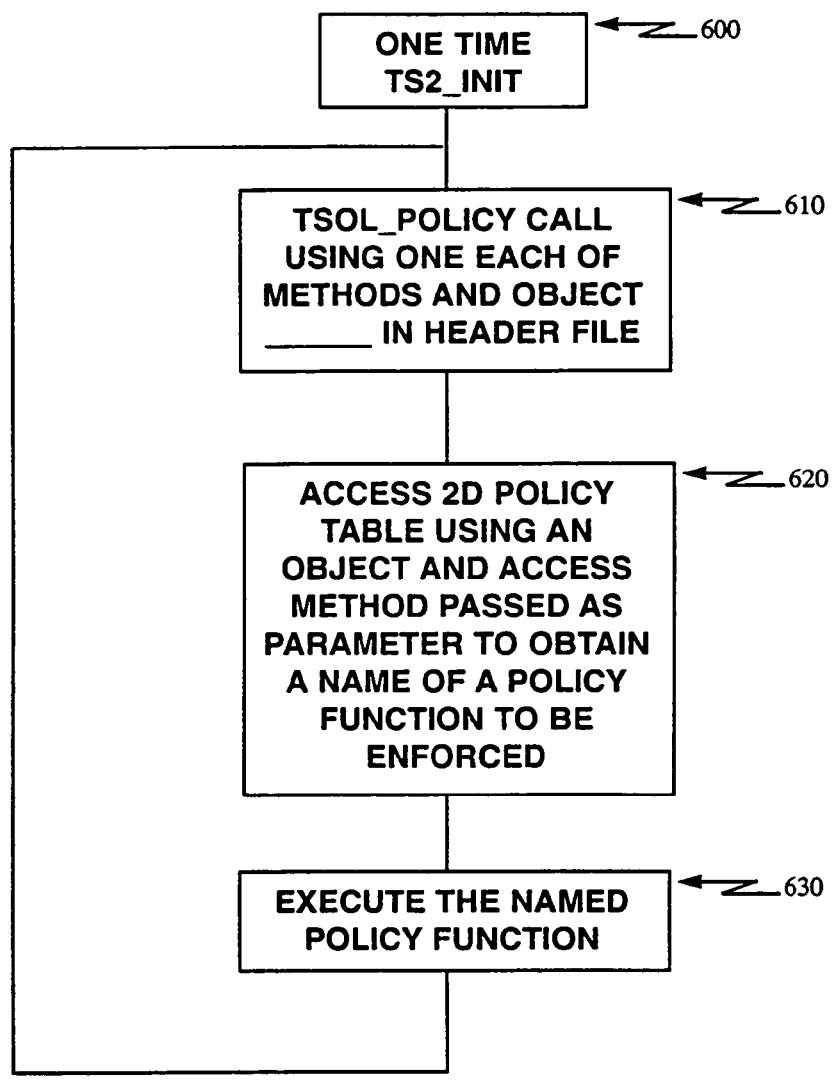
FIG. 6 is a flow chart of processing of a security function code.

In FIG. 6, a one time process, TS2-INIT is invoked (600). The purpose of TS2-INIT is to initialize certain global data structures such as those utilized in conjunction with header file for the system. It is done once upon initialization and is not needed thereafter until the next system reboot. A TS2_policy call is invoked using one each of the methods and objects enumerated in the header file.

The objects and access method passed are parameters utilized to access the two dimensional policy table to obtain the name of a policy function to be enforced. Once the name of the policy function is identified, it is executed and the policy enforced. The loop back to the top of Box 610 is intended to show that multiple TS2_policy calls may be invoked at any time during the processing of system program.

An example will now be given of the interaction described in the flowchart of FIG. 6 to illustrate how the system interacts with the policy module.

After the TS2_INIT function has been called, one wishes to utilize the standard programming and interface or hook to obtain access to security functions. An exemplary TS2_WINDOWS policy table is shown in Table 1.

The resources and the access methods permitted for a particular system are enumerated in the header file. A sample policy header file is shown in Table 2.

Knowing which resources and which access modes are permitted for particular systems, enables one to map various combinations of resource and access mode to a finite set of policy functions. As can be seen from Table 2, there is a significant list of access functions and a larger list of resources. Thus, when a call is made from the system to the TS2 Windows Policy Table, a value for the security function, in this case, the value of the security function associated with TS2_RES_PIXELS and a READ_ACC access mode is a READ_PIXELS function.

A sample operational use of the TS2_policy interface is described in FIG. 3.

With the standardized calls, in referring to Table 1 set forth above, one can see that the resource TS2_RES_PIXELS and the access method TS2_ACC_READ point to a policy function entitled READ_PIXELS. A sample READ_PIXELS is set forth in Table 4.

It is important to note that the pseudocode set forth in the attached tables is written in the style of the C programming language.

Thus, the invention permits one to isolate all security features and policies into a single module or mechanism where it can be updated and controlled easily and in which the disadvantages and problems encountered by the prior art can overcome.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

TABLE 1

| TS2_Windows Policy Table (Table Format) | | | | | |
|---|---|---|---|---|---|
| | READ | MODIFY | CREATE | DESTROY | ATTACH |
| ... | ... | ... | ... | ... | ... |
| TS2_RES_PIXELS | read... pixels | mod__ pixels | | | |
| TS2_RES_GC | read__ gc | modify__ gc | create_gc | destroy_gc | attach_gc |
| ... | ... | ... | ... | ... | ... |

TABLE 2

Sample of ts2_policy.h

\* Copyright (c) 1994, by Sun Microsystems, Inc.
\* All Rights Reserved
\*/

TABLE 2-continued

Sample of ts2_policy.h

```
#ifndef _X11_TS2_POLICY_H
#define _X11_TS2_POLICY_H
#pragma ident    "@(#)ts2_policy.h 1.0 95/07/15 SMI"
#ifdef _cplusplus
extern "C" {
#endif
/* Sample Table Driven Policy Lookup */
#define ts2_policy(method, res_type, object, subject, policy_flags,
misc)\
(TS2_X_policy_table [res_type] [method]) (object, subject,
policy_flags, misc)
/*
 * Policy checking flags:
 */
#define MACcheck       (0x01)    /* do MAC policy */
#define FLOATcheck     (0x02)    /* do IL floating */
#define DACcheck       (0x04)    /* do DAC policy */
#define AUDITcheck     (0x08)    /* append to audit record */
#define OVERRIDEcheck  (0x10)    /* privilege and user policies */
#define ALLcheck       (0xff)    /* do it all */
/*
 * Object Identifier Types:
 */
enum res_types {
    TS2_RES_PIXELS,
    TS2_RES_RES_SL,
    TS2_RES_RES_IL,
    TS2_RES_WIN_IIL,
    TS2_RES_RES_UID,
    TS2_RES_WIN_LOC,
    TS2_RES_WIN_SIZE,
    TS2_RES_WIN_PARENT,
    TS2_RES_WIN_CHILDREN,
    TS2_RES_WIN_STACK,
    TS2_RES_WIN_PROPS,
    TS2_RES_WIN_SECONDARY,
    TS2_RES_WIN_ATTR,
    TS2_RES_WIN_GEOM,
    TS2_RES_PROP_DATA,
    TS2_RES_PROP_SL,
    TS2_RES_PROP_UID,
    TS2_RES_ATOM,
    TS2_RES_GC_DATA,
    TS2_RES_GC_SECONDARY,
    TS2_RES_FONT_ATTR,
    TS2_RES_FONT_PATH,
    TS2_RES_CURSOR,
    TS2_RES_CMAP,
    /* etc. */
    TS2_MAX_OBJ_TYPES
};
/*
 * Access Policy Types:
 */
enum access_methods {
    TS2_ACC_READ,       /* get, read, query, . . . */
    TS2_ACC_MODIFY,     /* set, write, draw, . . . */
    TS2_ACC_CREATE,     /* create, make, mount, . . . */
    TS2_ACC_DESTROY,    /* delete, unlink, unmount . . . */
    TS2_ACC_ATTACH,     /* secondary objects as qualifiers */
    /* etc. */
    TS2_MAX_METHODS
};
extern int (*TS2_X_policy_table [TS2_MAX_OBJ_TYPES]
[TS2_MAX_METHODS]) ( );
#ifdef _cplusplus
}
#endif
#endif /* _X11_TS2_POLICY_H */
```

TABLE 3

Copy Area Sample Implementation

```
ProcCopyArea(src, dest, gc, coordinates)
{
    start of function
    . . .
/* audit record is started by caller of this procedure */
#ifdef /* _TS2_ */
    if (ts2_policy(TS2_ACC_READ, TS2_RES_PIXELS, src,
    client, ALL, xid) == FAILED)
        return BadDrawable;
    if (ts2_policy(TS2_ACC_MODIFY, TS2_RES_PIXELS, dest,
    client, ALL, xid) == FAILED)
        return BadDrawable;
    if (ts2_policy(TS2_ACC_READ, TS2_GC, gc, client, ALL,
    xid) == FAILED)
        return BadGC;
#endif /* _TS2_ */
/* audit record is terminated by caller of this procedure
    */
    . . .
rest of function
}
```

TABLE 4

```
/* POLICY DESCRIPTION
 * Pixels are associated with windows and drawables.
 * Both are subject to MAC and DAC protection.
 * The root window has a special policy defined in
        read_root_pixels . . .
 * Obscured windows have an additional access policy. . .
 *
 */
read_pixels(src, client, policy_flags, xid)
{
    if (type_of(src) == WINDOW) {
        if (is_root(src)) {
            if (read_root_pixels(src, client)) {
                float_client(client, IL(src))
                return PASSED
            }else
                return (error_policy( ));
        }else if ((policy_flags & MAC)?
                    (mac_read_pixels(src, client)
    : 1)
        && (policy_flags & DAC)? (dac_read_pixels (src,client) : 1)) {
        if (obscured)
                read_obscured_pixels ( ) /* generate sanitized view */
        if (policy_flags & IL)
                flat_client (client, IL (src)) ;
        return PASSED;
    }else
        return (error_policy ( ));
} /* PIXMAPS test follows */
if ((policy_flags & MAC)? (mac_read_pixels(src, client)
:1)
    && (policy_flags & DAC)? (dac_read_pixels(src, client) :1)){
    if (policy_flags & IL)
            float_client (client, IL(src))
    return (PASSED);
    }else
    return (error_policy( ));
}
```

The invention claimed is:

1. Secure computer apparatus comprising:
   a. a computer; and
   b. a secure operating system on said computer controlling access to one or more systems, comprising:
      b1. a common interface used for calls to all security functions, and
      b2. a table accessed by variables specified in a call using said interface, each entry in the table pointing to a security policy function appropriate to the variables specified in said call.

2. Apparatus of claim 1 in which a call using said common interface passes variables identifying a resource and an access mode.

3. Apparatus of claim 2 in which a call using said common interface passes one or more of variables pointing to data, identifying attributes of a requestor, identifying portions of security policy to be enforced and specifying miscellaneous functions.

4. A method of organizing a secure operating system, comprising the steps of:
   a. providing a common interface used for all requests for security functions;
   b. providing a separate file of security functions; and
   c. providing a table accessed by information provided in a request for security functions which point to an appropriate security function in said separate file.

5. A method of invoking security functions in a secure operating system, comprising the steps of:
   a. providing an element for performing the step of requesting security functions in a program call using an interface common to all systems using security services,
   b. providing an element for performing the step of accessing a table based on information provided in said call; and
   c. providing an element for performing the step of invoking a security function pointed to by said table.

6. A method of creating a secure operating system, comprising the steps of:
   a. providing an element for performing the step of inserting compiler directives at points in operating system code at which security services are needed, the directives accessing a security policy table using resource and access method information;
   b. providing an element for performing the step of storing at each entry in said security policy table a pointer to a security function appropriate to the resource and access method; and
   c. providing an element for performing the step of storing said table and security functions in a separate file from said operating system code.

7. The method of claim 6 in which said operating system code and said table and security functions are separately compiled.

8. The method of claim 7 in which object code versions of said operating system code and object code versions of said table and security functions are linked together to created an executable version of said secure operating system.

9. A method of changing security policy for a secure operating system, comprising the steps of:
   a. changing a security policy table or one or more security functions and recompiling both the security policy table and the one or more security functions; and
   b. linking a recompiled security policy table and one or more security functions with an unchanged object code version of said operating system.

10. A method of creating a secure operating system, comprising the step of:
separating all security functions into a file separate from operating code.

11. The method of claim 10 in which all security functions are accessed using requests in a common format.

12. A secure computer system, comprising:
   a. a network, and
   b. a plurality of computers connected to said network, at least one of said computers having a secure operating system controlling access to said network and to other sub-systems, said operating system having a common interface used for calls to all security functions, and a table accessed by variables specified in a call using said interface, each entry in the table pointing to a security policy function appropriate to the variables specified in said call.

13. A computer product, comprising:
   a. a memory medium; and
   b. a computer program stored on said memory medium, said computer program containing instructions implementing one or more operating system functions and implementing a common interface used for all requests for security functions; a separate file of security functions, stored on said memory medium, and a table, stored on said memory medium and accessed by information provided in a request for security functions which points to an appropriate security function in said separate file.

14. A computer program product, comprising:
   a. a memory medium; and
   b. a separate file of security functions, stored on said memory medium, and a table, stored on said memory medium and accessed by information provided in a request for security functions which points to an appropriate security function in said separate file.

15. A computer program product, comprising:
   a. a memory medium; and
   b. an operating system stored on said memory medium, said operating system containing instructions implementing a common interface used for all calls for security functions.

16. A computer program product, comprising:
   a. a memory medium; and
   b. a computer program stored on said memory medium, said computer program containing instructions for requesting security functions in a program call using an interface common to all systems using security services.

17. A computer program product, comprising:
   a. a memory medium; and
   b. a computer program stored on said memory medium, said program comprising an object code version of operating system code linked together with an object code version of security functions; wherein the security functions enforce two or more of mandatory access control, discretionary access control, information labeling and auditing policies.

* * * * *